United States Patent
Christoph et al.

(10) Patent No.: US 7,277,022 B2
(45) Date of Patent: Oct. 2, 2007

(54) SENSOR DEVICE AND METHOD FOR ARRANGING A SENSOR DEVICE ON A MOUNTING PLATE

(75) Inventors: Markus Christoph, Regensburg (DE); Christian Plankl, Burgweinting (DE)

(73) Assignee: Siemens Aktiengesellschaft, Munich (DE)

( * ) Notice: Subject to any disclaimer, the term of this patent is extended or adjusted under 35 U.S.C. 154(b) by 484 days.

(21) Appl. No.: 10/488,697

(22) PCT Filed: Sep. 6, 2001

(86) PCT No.: PCT/DE01/03430

§ 371 (c)(1), (2), (4) Date: Nov. 22, 2004

(87) PCT Pub. No.: WO03/027515

PCT Pub. Date: Apr. 3, 2003

(65) Prior Publication Data
US 2005/0078010 A1   Apr. 14, 2005

(51) Int. Cl.
*G08B 23/00* (2006.01)

(52) U.S. Cl. .................. 340/693.5; 361/679

(58) Field of Classification Search .......... 248/222.41, 248/223.21, 221.12, 222.51, 221.11; 340/693.5; 361/679
See application file for complete search history.

(56) References Cited

U.S. PATENT DOCUMENTS

| | | | | |
|---|---|---|---|---|
| 5,714,409 A | * | 2/1998 | Parsons | 430/51 |
| 5,950,973 A | * | 9/1999 | Verma | 248/222.51 |
| 6,193,198 B1 | * | 2/2001 | Baur et al. | 248/222.41 |
| 6,264,232 B1 | * | 7/2001 | Clark | 280/728.2 |
| 6,266,250 B1 | * | 7/2001 | Foye | 361/760 |

FOREIGN PATENT DOCUMENTS

| | | |
|---|---|---|
| EP | 0 987 447 A2 | 3/2000 |
| WO | WO 00/47451 | 8/2000 |

* cited by examiner

*Primary Examiner*—Lisa Lea-Edmonds
*Assistant Examiner*—Anthony M. Haughton
(74) *Attorney, Agent, or Firm*—Morrison & Foerster LLP (57) ABSTRACT

The invention relates to a sensor device containing a housing (1) and a spring element (9) comprising a guiding element (5) for displacing the sensor device over a mounting plate (7) in a guided manner. Said guiding element (5) co-operates with a guiding means (12) of the mounting plate (7). In a mounting position of the sensor device, said sensor device engages in the mounting plate (7) and is fixed to the same.

9 Claims, 7 Drawing Sheets

SENSOR DEVICE AND METHOD FOR ARRANGING A SENSOR DEVICE ON A MOUNTING PLATE

CLAIM FOR PRIORITY

This application claims priority to International Application No. PCT/DE01/03430 which was published in the German language on Sep. 6, 2001.

TECHNICAL FIELD OF THE INVENTION

The present invention relates to a sensor device and a method for arranging a sensor device on a mounting plate of a motor vehicle.

BACKGROUND OF THE INVENTION

Airbag and belt-tightener units are important passenger-restraining means for protecting motor vehicle passengers in the event of an accident involving a frontal or side impact. Signals from sensor devices are used for deciding when to release the airbag or belt-tightener unit. Acceleration sensor devices, in particular, are fitted centrally in the airbag controller or non-centrally at another point in the vehicle. Central is deemed here to refer in particular to the position in the housing of an airbag controller which is usually fitted under the central console in the motor vehicle. Consequently, any fitting of a control or sensor device outside the airbag controller is referred to as non-central or external. Non-central sensor devices are therefore often referred to as airbag satellites or simply as satellites.

It is important in the case of acceleration sensor devices, in particular, to achieve a mechanically highly rigid coupling of the airbag satellite with the vehicle body. If this does not exist, the mechanical transfer function between satellite and vehicle body changes, and the satellite transmits in part falsified signals. For mounting external airbag controllers, in the main metallic mounting plates, on which the satellites are rigidly fastened by means of screws and counter screws, are fitted in the motor vehicle.

The sensor signals are evaluated in the airbag satellites themselves or in the central airbag controller by algorithms which have to be adapted for each vehicle type. The computational results of the algorithms are from time to time very different for different mounting locations. Especially in the case of acceleration sensor devices, it is therefore particularly important to mount the airbag satellites reproducibly at the same point on the vehicle body, since only in this way can the same evaluation of an impact event be guaranteed for all the vehicles in a vehicle line. Special mounting aids and mounting procedures which prevent any incorrect positioning of an airbag satellite are therefore used in production in the automotive industry.

Figure 5A:
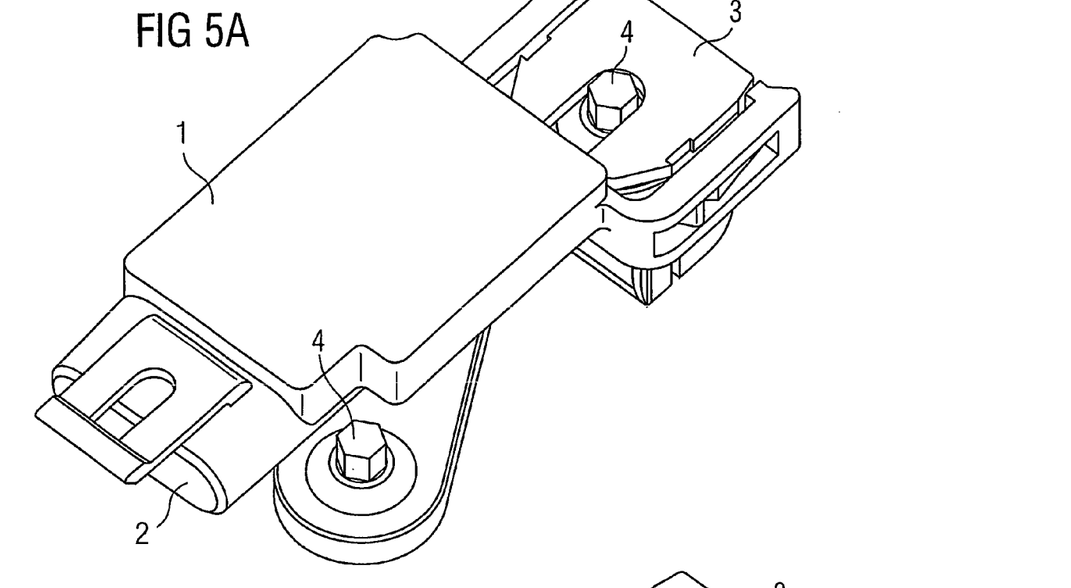
FIGS. 5a and 5b show a perspective view of a known sensor device with a mounting cover in an initial position and in a final position.
Figure 5B:
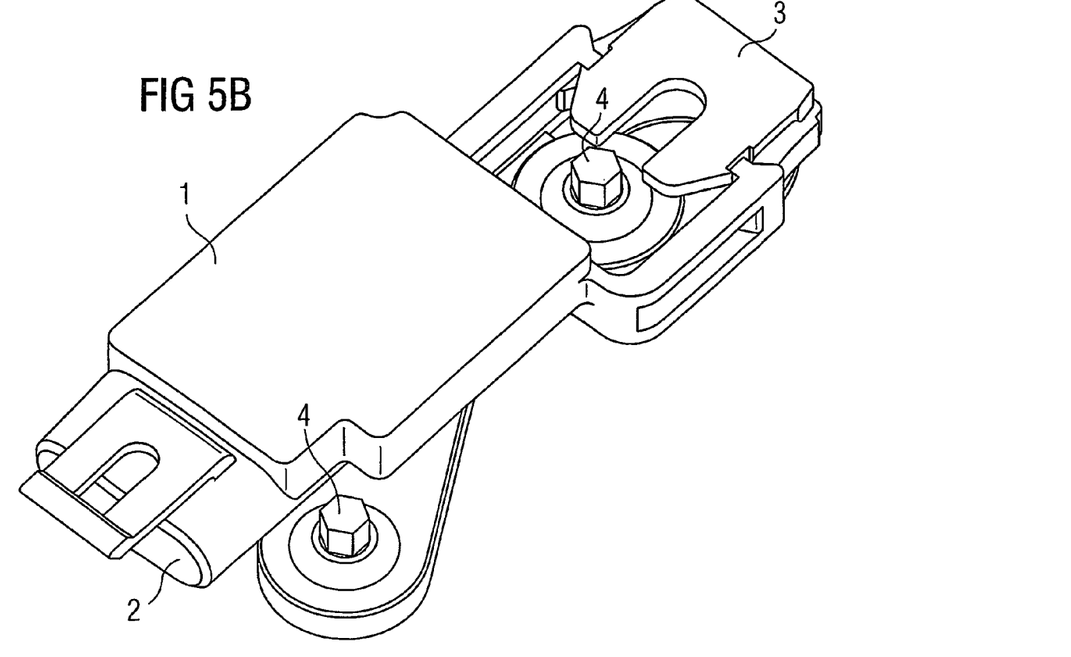

FIGS. 5a and 5b show a known mounting aid in the form of a mounting cover 3 which is placed on a housing 1 of an airbag satellite. FIG. 5a shows the airbag satellite before installation in the motor vehicle. In this arrangement, the fastening screws 4 cannot be tightened, as the mounting cover prevents access with a mounting tool. Only in the installation position intended for that purpose, as shown in FIG. 5b, can the satellite be fastened to a mounting support.

Figure 6A:
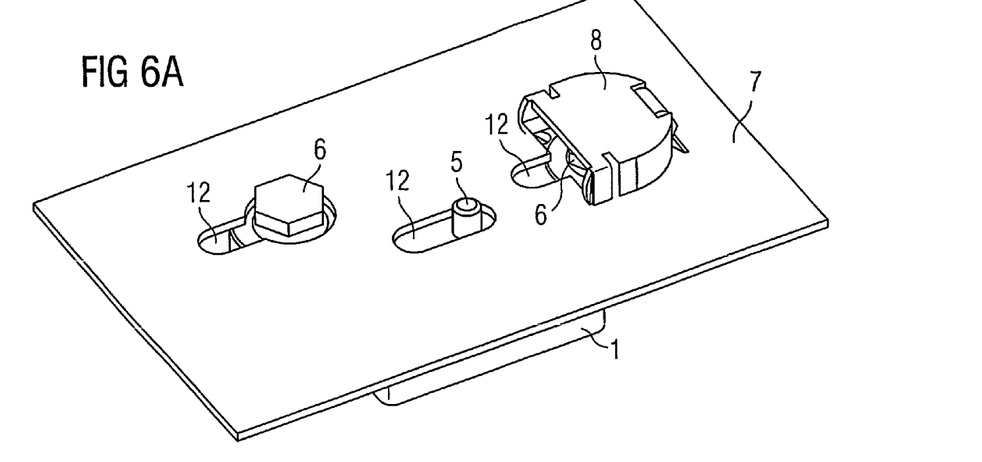
FIGS. 6a and 6b show the known sensor device according to FIGS. 5a and 5b from a different viewpoint.
Figure 6B:
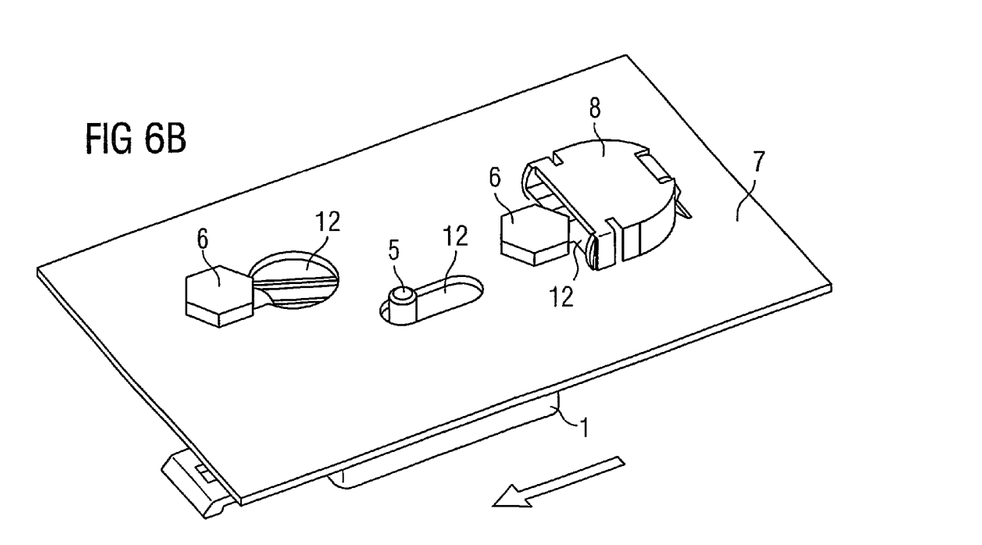

FIGS. 6a and 6b show the same two arrangements of the satellite on a mounting plate 7, viewed from the back.

The two FIGS. 6a and 6b illustrate the known method for mounting an airbag satellite:

- The housing 1 is placed on a mounting plate 7 using a positioning aid 8 (FIG. 6a).
- The housing 1 of the satellite is then displaced in the direction of the arrow (FIG. 6b).
- The satellite is then fastened to the mounting plate 7 through the cooperation of mounting means.

A disadvantage of this known mounting aid is the two-part formation of housing and the mounting aid, in particular a mounting cover. The use of two separate components in the production of an airbag satellite entails a high additional logistical outlay. This comprises the handling of a greater number of components and an additional process step in which a housing and a mounting cover have to be assembled.

SUMMARY OF THE INVENTION

The invention is to enable reproducible positioning of an airbag satellite in a motor vehicle with high positioning accuracy appropriate to its use.

The sensor device according to one embodiment of the invention includes, in addition to its housing, a spring element with a guiding element arranged thereon, the two of which together replace the known mounting cover.

A guiding element refers here to any type of construction which can engage in a guiding device, in particular a lug into a through recess of a mounting plate.

On the other hand, the guiding element can conversely be fashioned such that, when being mounted, a guiding device of the mounting plate engages in the recess of the sensor device, in particular a lug of the mounting plate into a cavity in the housing.

A sensor device with a guiding element on a mounting plate according to one of the two proposed designs can preferably be displaced in the direction which is predetermined by the guiding device.

An advantageous further embodiment of the invention is the spring element with its guiding element as a part of the housing, in particular of a housing made of plastic or metal. The described disadvantage of the mounting cover can be avoided by the invention. Compared with manufacture of a sensor device having a mounting aid comprising two parts, production is simplified substantially.

The formation according to the invention of the sensor device enables a simple method for arranging a sensor device on a mounting plate.

BRIEF DESCRIPTION OF THE DRAWINGS

Embodiments of the invention are described in detail below with reference to schematic diagrams, in which.

The same elements and components of the embodiments are labeled in the Figures below by means of the same reference symbols.

DETAILED DESCRIPTION OF THE INVENTION

The sensor device is referred to below also as an airbag satellite or satellite.

Figure 1A:
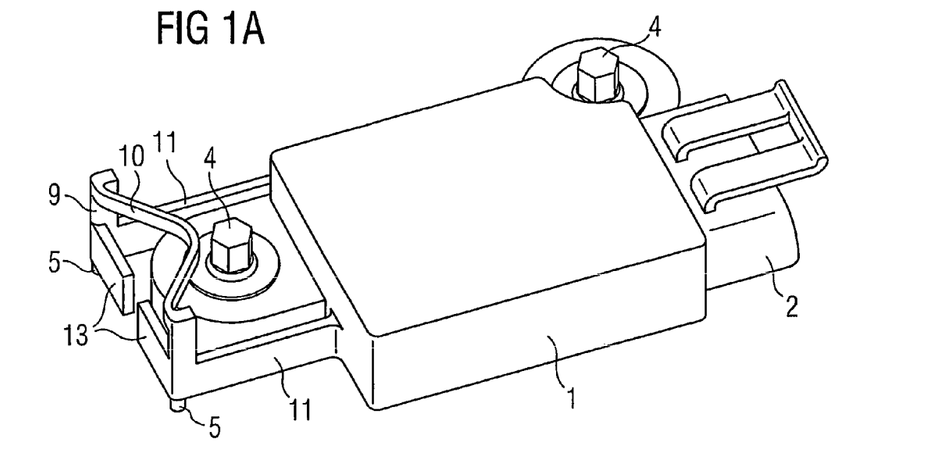
FIGS. 1a and 1b show a perspective view from two sides of a sensor device according to the invention.

FIG. 1a shows a sensor device comprising a housing 1 and comprising a spring element 9 with a guiding element 5. The spring element 9 has two substantially parallel spring bars 11, the ends of which are fashioned in one direction as guiding lugs. These are suitable for engaging as a guiding element 5 in recesses of a mounting plate 7 fashioned as a guiding means 12. An arrangement is deemed substantially parallel here in which the two spring bars 11 form preferably no angle to one another, but at most an angle of 15 degrees.

In order to protect the spring bars 11 against mechanical overload when deflected, a further part of the spring bars 11 serves as a spring tension limiter 13.

The two ends of the spring bars 11 are connected to one another via an elastic connecting bridge 10.

As an advantageous further embodiment of the invention, the spring bars 11 with the guiding lugs 5 and the connecting bridge 10 are in the embodiment fashioned in one piece with the housing 1 of the sensor device. The sensor device includes therefore of fewer components, as a result of which the outlay in respect of production and assembly is reduced.

Fastening screws 4 are also to be seen as mounting means. These are suitable for cooperating with the corresponding counter screws as mounting counter device so that the satellite can be fastened on a mounting support in the motor vehicle. Alternative mounting devices are combinations of fastening screws and screw threads or other mechanically rigid forms of connection such as snap-on connections, riveted joints, etc. Fastening screws and screw threads find the necessary counter-hold on the opposite side of a mounting plate in the form of mounting counter device, in particular counter screws, screw nuts and screw heads.

Figure 2A:
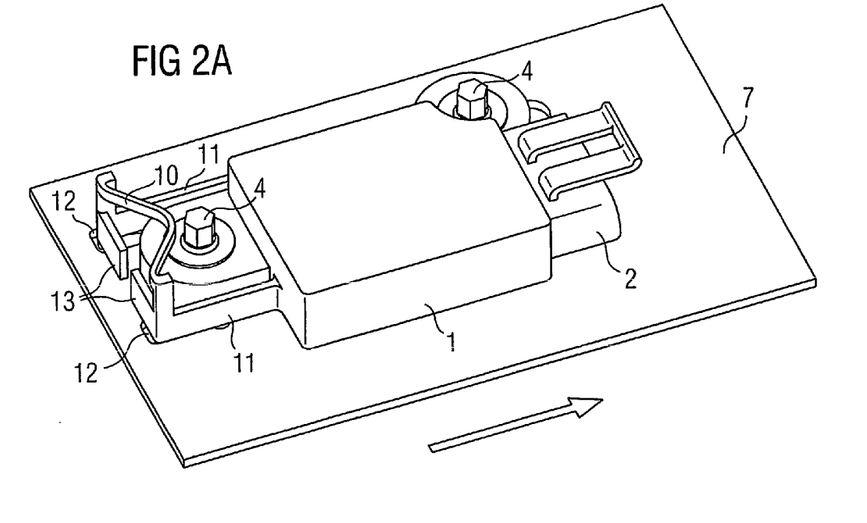
FIGS. 2a and 2b show the sensor device according to FIGS. 1a and 1b on a mounting plate in an initial position and in a final position.
Figure 2B:
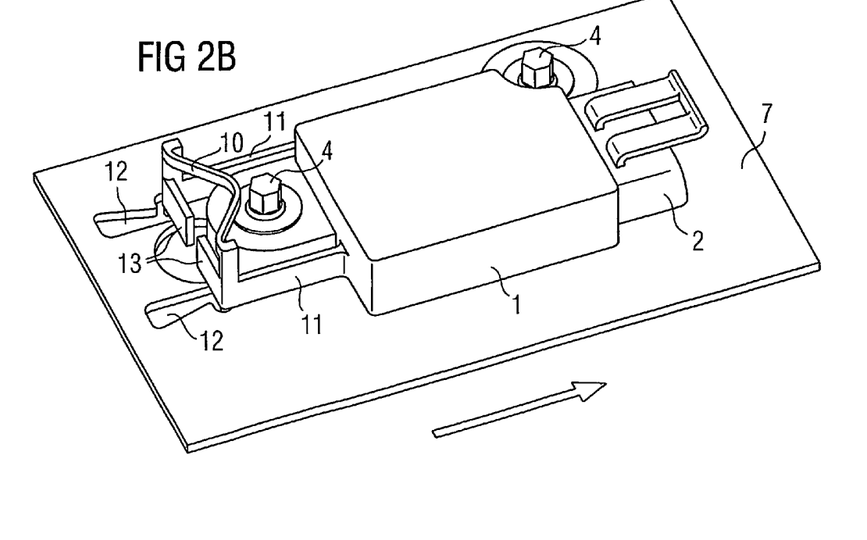

FIGS. 2a, 2b, 3a and 3b show an airbag satellite on a mounting plate 7 from the front and from the back respectively. The back here refers to the side of the airbag satellite facing the mounting plate. The arrangement of the satellite on the mounting plate 7 is explained with reference to these Figures:

After insertion of the satellite, the guiding lugs 5 engage in the guiding means 12 of the mounting plate 7 (FIG. 2a). The satellite is thereafter brought into the mounting position. This can be done manually or mechanically. Displacement takes place in the direction of the arrow. In this mounting position, the fastening screws 4 are tightened with the aid of a mounting tool (FIG. 2b).

Figure 3A:
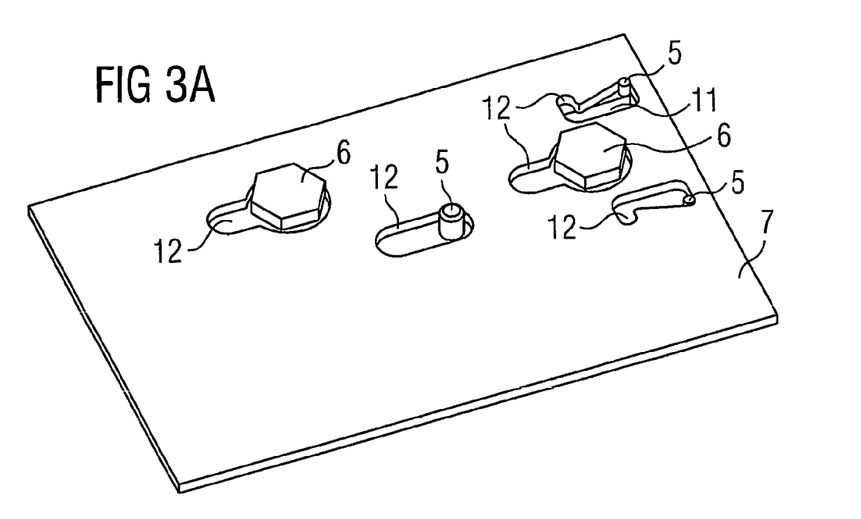
FIGS. 3a and 3b show the sensor device according to FIGS. 2a and 2b from a different viewpoint.
Figure 3B:
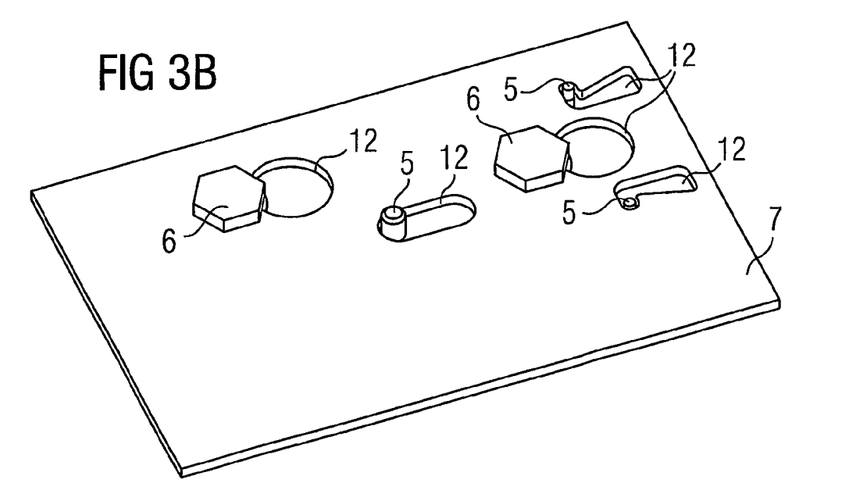

FIGS. 3a and 3b show the same arrangements from the back. Counter-screws 6 in FIG. 3b as a mounting counter device of fastening screws 4 from FIG. 2a are arranged over a tapering of the two guiding means 12 such that, screwed down, they can provide the air bag satellite with the necessary hold.

In the case of the acceleration sensor device (the airbag satellite) described thus far, the housing 1 can be fashioned such that access with a mounting tool to the fastening screws 4 and fastening of the airbag satellite is possible in its mounting position. This is achieved by means of the elastic connecting bridge 10.

As shown in the embodiment according to FIG. 2a, the connecting bridge 10 is arranged between the deflectable ends of the two parallel spring bars 11.

The connecting bridge 10 is deflected in an end position as shown in FIG. 2a. Access to the fastening screw 4 which lies nearest to the connecting bridge is thereby prevented.

In its rest position, shown in FIG. 2b, the elastic connecting bridge is deflected to the extent that access with a mounting tool to the fastening screw is possible.

The housing of a sensor device according to the present invention is manufactured for the most part from plastic. Like any material, plastic can be deformed without breaking up to a maximum mechanical loading. In order, in the embodiment according to FIGS. 1a and 1b, to protect the connecting bridge 10 and the spring bars 11 against too high a mechanical loading (and in particular against material failure) a spring tension limiter 13 is provided. This is fashioned in the form of mechanical lugs on both sides of the ends of the spring bars 11.

Figure 1B:
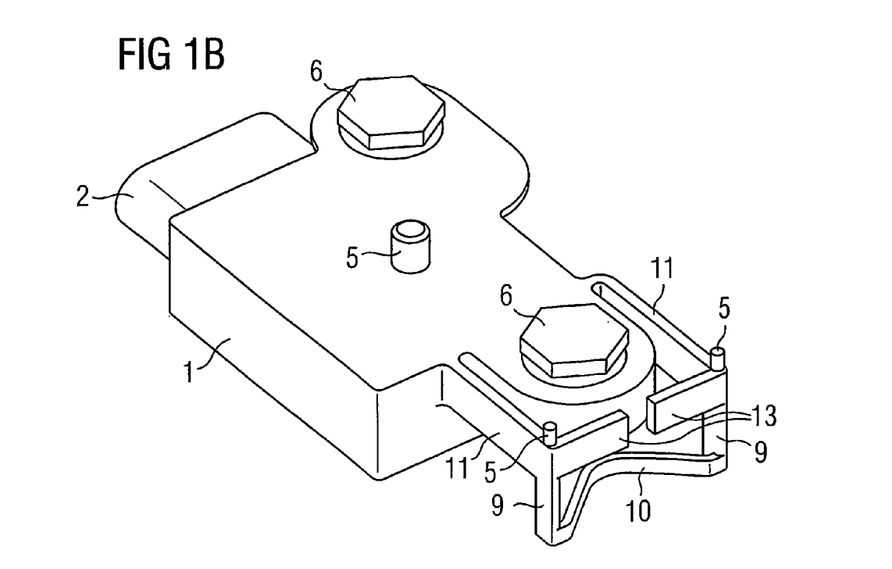

As shown in the embodiment, it is advantageous to fashion the spring bars 11, the connecting bridge 10 and the spring tension limiter 13 as one piece with the housing 1. The sensor device then comprises fewer components, as a result of which the cost of manufacture and assembly is reduced.

The method for mounting an airbag satellite is described below with reference to FIGS. 2a and 2b:

The sensor device is first inserted with a guiding element, for example with the guiding lugs 5 on the spring element 9, into the guiding device 12 of the mounting plate 7 (cf. FIG. 2a).

The sensor device is then displaced over the mounting plate 7, whereby the direction of displacement is predetermined by the guiding device 12 (direction of arrow in FIG. 2a). This can be effected manually or automatically.

In the mounting position of the airbag satellite, the guiding element 5 of the sensor device engages in the guiding device 12 of the mounting plate 7 (see FIG. 2b).

The airbag satellite is then rigidly fastened on the mounting plate 7 with a mounting device.

When the satellite is displaced, the spring element 9 and in particular its spring bars 11 are deformed. In the mounting position, the spring bars 11 relax as the guiding lugs 5 engage in the guiding device 12 of the mounting plate 7 (see FIG. 2b).

Figure 7:
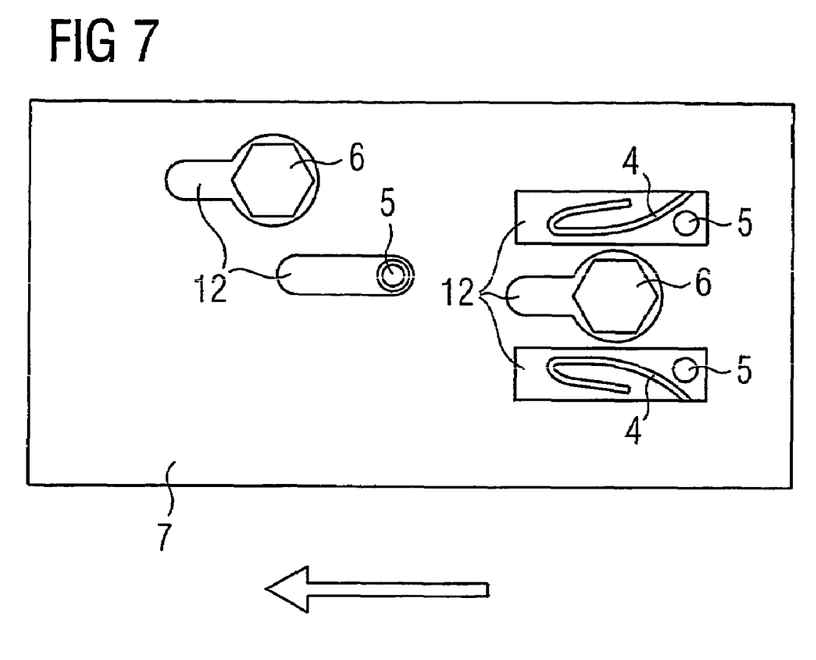
FIG. 7 shows a sensor device for an alternative method for engaging the satellite in the mounting position.

In an alternative method, a spring element is arranged on the mounting plate 7. The guiding element 5 of the airbag satellite can in this case be fashioned rigidly:

FIG. 7 shows an airbag satellite on a mounting plate 7 on which a spring element 14 is arranged. If the satellite is displaced in the direction of the arrow, the spring element 14 is deformed until the guiding lugs 5 have been guided past said spring element. The satellite is then engaged in its mounting position.

The airbag satellite is then rigidly fastened on the mounting plate 7 with a mounting device.

In a further embodiment of the method, access of a mounting tool to the mounting device 4 and fastening of the airbag satellite on the mounting plate 7 are enabled in the mounting position of the airbag satellite. The principle is explained using FIGS. 2a and 2b: the connecting bridge 10 of the spring element 9 of the sensor device is deflected to an end position (see FIG. 2a), but rests in a rest position (see FIG. 2b).

A mounting tool can access the mounting device 4 of the sensor device either in the end position or rest position of the spring element 9 and fasten the satellite rigidly on the mounting plate 7.

The spring element 9 does not have to be fully deflected, for example until a mechanical stopping point is reached, in the end position. The end position and the rest position of the connecting bridge 10 are characterized rather by the fact that access to the mounting device 4 and fastening of the airbag satellite on the mounting plate are either enabled or prevented.

The connecting bridge 10 preferably prevents access of a mounting tool to the mounting device 4 during displacement of the airbag satellite over the mounting plate 7 to the mounting position. In the mounting position, a mounting tool then access the mounting device 4 and fasten the airbag satellite rigidly on the mounting plate 7.

Figure 4:
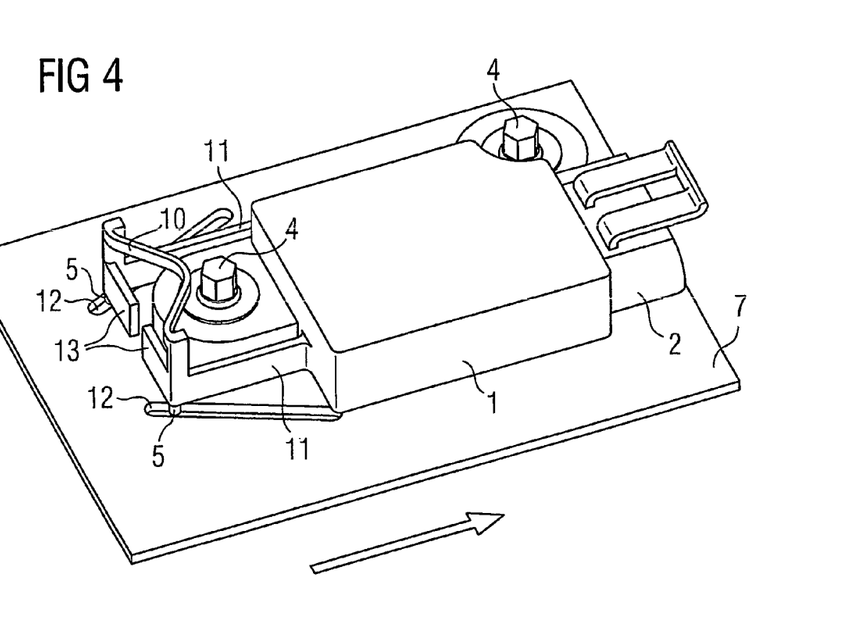
FIG. 4 shows a sensor device for displacing the satellite to the mounting position.

In the method according to the invention the satellite has to be actively displaced, either mechanically or manually. Alternatively, the guiding device 12 can be formed such that the guided displacement of the airbag satellite is driven by the spring tension of the preloaded spring element 9. A possible arrangement is shown in FIG. 4.

In order to insert the airbag satellite into the guiding device 12, the spring element 9 has to be mechanically preloaded. The guiding device 12 of the satellite are arranged obliquely relative to the direction of the arrow such that the spring tension of the spring element 9 and of the elastic connecting bridge 10 is released as a result of the spring element 9 moving to the mounting position. After insertion of the spring element 9 into the guiding device 12 the airbag satellite therefore moves without any further external assistance to its mounting position until the guiding element 5 engages with the mounting plate 7. The airbag satellite is fastened in this position.

The sensor device according to the invention and the method according to the invention for arranging a sensor device are described here only with reference to an airbag satellite. However, the invention covers all sensor devices which are arranged on a mounting plate and corresponding methods for their arrangement.

What is claimed is:

1. A sensor device, comprising:
   a housing;
   a spring element including at least two spring bars arranged substantially parallel having a guiding element for displacing the sensor device over a mounting plate in a guided manner, wherein the guiding element is fashioned to cooperate with a guiding device of a mounting plate;
   a mounting device on a housing for arranging the sensor device on the mounting plate with the aid of a mounting tool; and
   an elastic connecting bridge arranged between the at least two spring bars, wherein access to the mounting device with the mounting tool is prevented in a deflected position of the at least two spring bars by the connecting bridge, and access is enabled with the at least two spring bars in a released position, and in the mounting position of the sensor device the at least two spring bars are in a released position.

2. The sensor device according to claim 1, wherein the spring element, and the connecting bridge, are configured as one piece with the housing.

3. The sensor device according to claim 2, wherein
   the elastic connecting bridge is arranged between deflectable ends of the at least two spring bars.

4. The sensor device according to claim 1, wherein
   the spring element has a spring tension limiter.

5. The sensor device according to claim 4, wherein
   the spring tension limiter is configured as mechanical stops on both sides of ends of the spring bars.

6. A method for arranging a sensor device on a mounting plates, the sensor device having a spring element which comprises a guiding element for displacing the sensor device over the mounting plate in a guided manner, and the guiding element is configured to cooperate with a guiding device of the mounting plate, comprising:
   inserting the sensor device with a guiding element into the guiding device;
   displacing the sensor device along the guiding device over the mounting plate in a guided manner;
   engaging the sensor device in a mounting position with the guiding element in the guiding device of the mounting plate; and
   fastening on the mounting plate in the mounting position with a mounting device, wherein
   the spring element in a deflected position prevents access with a mounting tool to the mounting device of the sensor device, such that access is enabled when the spring element is in a released position.

7. The method according to claim 6, wherein
   the spring element is deflected during guided displacement of the sensor device along the guiding device such that access with the mounting tool to the mounting device of the sensor device is prevented, and in a mounting position of the sensor device such access is enabled.

8. The method according to claim 6, wherein access to the mounting device with aid of the mounting tool is prevented by an elastic connecting bridge which connects the spring element with two movable ends of the spring element of a two-part design in the form of two spring bars arranged parallel.

9. The method according to claim 6, wherein
   spring tension of the spring element causes the sensor device to be displaced over the mounting plate in a guided manner.

* * * * *